United States Patent [19]

McDonell et al.

[11] Patent Number: 5,494,150

[45] Date of Patent: Feb. 27, 1996

[54] CONVEYOR BELT SYSTEM WITH SHOCK-ABSORBING BELT SIDE TRAVEL CONTROL MEANS

[75] Inventors: Brent J. McDonell; Gordon Shewchuk, both of Fort McMurray; Isaac M. Gafur, Edmonton; Jimmy Tom, Fort McMurray, all of Canada

[73] Assignees: Alberta Energy Company Ltd.; Canadian Occidental Petroleum Ltd.; Esso Resources Canada Limited, all of Calgary; Gulf Canada Resources Limited, Toronto; Her Majesty the Queen in right Canada, as represented by the Minister of Energy and Natural Resources, Edmonton; HBOG-Oil Sands Limited Partnership, Calgary; PanCanadian Petroleum Limited, Calgary; Petro-Canada Inc., Calgary; Mocal Energy Limited, Calgary; Murphy Oil Company Ltd., Calgary, all of Canada

[21] Appl. No.: 263,343

[22] Filed: Jun. 21, 1994

[51] Int. Cl.⁶ .................................................. B65G 43/00
[52] U.S. Cl. ........................ 198/524; 198/526; 198/956
[58] Field of Search .................................. 198/524–526, 198/534, 810, 956, 810.03

[56] References Cited

U.S. PATENT DOCUMENTS 4,577,502  3/1986  Cunningham .......................... 198/810

FOREIGN PATENT DOCUMENTS

| 287697 | 3/1991 | Germany | 198/956 |
| 22681 | 2/1979 | Japan | 198/524 |
| 4327411 | 11/1992 | Japan | 198/956 |
| 256610 | 4/1970 | U.S.S.R. | 198/524 |
| 1745642 | 7/1992 | U.S.S.R. | 198/956 |

*Primary Examiner*—Joseph E. Valenza
*Attorney, Agent, or Firm*—Millen, White, Zelano & Branigan

[57] ABSTRACT

A batter board is interposed between an upper conveyor belt, that is discharging granular material, and a lower conveyor belt that is receiving it. The batter board is adapted to deflect the downwardly arching stream of material, to laterally adjust the location on the lower belt where the material is deposited. The extent of deflection practised is controlled in response to measurements which monitor the downstream belt side travel of the lower belt. The position of the batter board is adjusted with hydraulic actuators protected with a shock absorbing system.

2 Claims, 7 Drawing Sheets

CONVEYOR BELT SYSTEM WITH SHOCK-ABSORBING BELT SIDE TRAVEL CONTROL MEANS

FIELD OF THE INVENTION

The invention relates to a material transport system in which the side travel of a conveyor belt is controlled by use of a batter board, to deflect the stream of particulate material being deposited on the belt to adjust the location of deposition.

BACKGROUND OF THE INVENTION

Many material transport systems utilize conveyor belts to transfer particulate materials over considerable distances. Difficulties arise when the particulate material is transferred from one conveyor belt to another. A particular problem experienced in conveying oil sands over long distances from the mine site to the oil extraction facility is side travel of the conveyor belts. Side travel results in spillage of the oil sands and considerable downtime when the conveyor belts are shut down to rectify belt side travel that has caused the spillage.

The present invention is concerned with providing means for correcting side travel of a conveyor belt.

SUMMARY OF THE INVENTION

The present invention was developed for a particular material transport environment, although it is not so limited. In the oil sand mining operations of Northern Alberta, Canada, a plurality of conveyor belts are needed to transport the as-mined oil sands from the mine to the extraction plant. Upper and lower conveyor belts are arranged at an angle to transfer the oil sands from one belt to the next. As-mined oil sands comprise bituminous sands in association with clay shale, limestone and other miscellaneous rocks. Depending on such factors as ore grade and ambient temperature, the consistency of the as-mined oil sands may vary considerably. The oil sand can be a mixture of sticky particles and lumps in summer or frozen lumps in winter. The individual frozen lumps and rock can weight as much as several tons.

To assist in centering the particulate material onto the lower conveyor belt, a robust deflecting panel, termed a "batter board" is positioned between the conveyor belts. The particle impingement point of the batter board can be adjusted laterally relative to the lower conveyor belt to position the oil sands deposition location centrally on the lower conveyor belt. By centering the load on the conveyor belt, the maximum amount of particulate material can be conveyed.

As indicated hereinabove, difficulties arise with side travel of the conveyor belts. Applicants have found that the side travel of the conveyor belt is related to the lateral load distribution on the belt. Applicants have further found that there is a linear relationship between side travel of the conveyor belt and the particular lateral position of the batter board.

In a first aspect of the present invention, a system has been devised which incorporates a deflecting batter board and means for automatically adjusting the lateral position of the batter board in response to downstream monitoring of the side travel of the conveyor belt.

The adjusting system has application in any material transport system in which particulate material is transferred from an upper material discharge means, such as a conveyor or an inclined ramp or chute, downwardly onto a lower conveyor belt along a lateral arcuate path. Deflecting means are provided between the upper discharge means and the lower conveyor belt to interrupt the material's lateral motion, downwardly deflecting and directing the material to the lower conveyor belt. The deflecting means are laterally adjustable to alter the material's point of impingement and thus laterally adjust the location of deposition of the material on the lower conveyor belt. Sensing means are provided downstream of the transfer point for sensing lateral displacement of the lower conveyor belt. Means are provided for laterally adjusting the deflecting means in response to the detected lateral displacement of the lower conveyor belt.

As also described hereinabove, the as-mined oil sands material, which may contain large rock, impinges on the batter board. Considering that the material can discharge at velocities of 10 ft/sec, it may be appreciated that the deflecting means and the associated adjusting means are subject to intense physical abuse. Previous adjusting means suffered excessive and premature failure.

In a second aspect of the present invention, a hydraulic shock absorbing adjusting means is provided in combination with the deflecting means. A double acting hydraulic positioning ram is provided coupled to a shock absorbing hydraulic accumulator means. A control valve means directs hydraulic fluid to the ram, from a pressurized source, for enabling ram extension and retraction.

DETAILED DESCRIPTION OF THE PREFERRED EMBODIMENTS

Figure 1:
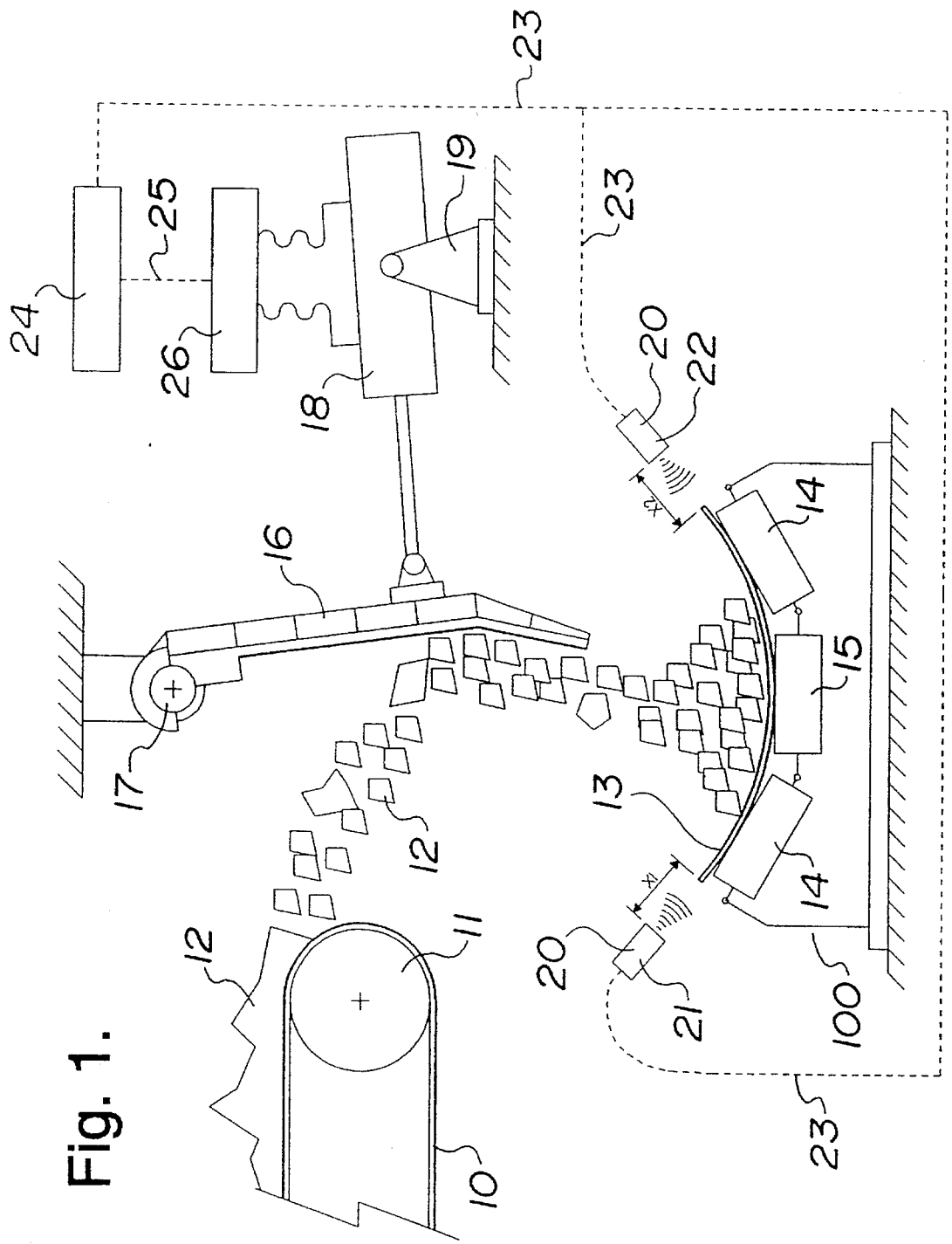
FIG. 1 is a sectional view of a material transport system wherein particulate material is transferred between upper and a lower conveyor belts and the material is deflected with an adjustable batter board.

Referring to FIG. 1, a material discharging means, comprising an upper conveyor belt 10 and end roller 11, transfers as-mined oil sand material 12 onto a perpendicularly disposed lower conveyor belt 13. The lower belt 13 is shown to be of troughlike section and is mounted on a roller assembly 100 having side rollers 14 and center idler rollers 15. The oil sand material 12 follows a downward arcuate path to the lower belt 13. A batter board 16 is positioned between the two belts 10, 13 so as to intercept the path of the moving material. The batter board 16 interrupts the angular (crosswise to the lower belt) motion of the oil sand material 12, directing it downwardly to position it laterally (i.e. side to side ) on the lower belt 13.

It will be apparent to those skilled in the art that other oblique arrangements of upper and lower conveyor belts 10,13 are possible; in each arrangement, discharge from the upper belt 10 imparts an angular component to the oil sands' motion, relative to the axis of the lower belt 13, which can then be redirected by the batter board 16.

The batter board 16 comprises a slightly concave or flat structural panel suspended generally vertically in the path of the falling material 12. The panel is rotatively mounted about pivot point 17. The position of the batter board 16 is adjusted by a positioning ram 18, connected between the batter board 16 and a stationary frame 19. Extension and retraction of the positioning ram 18 causes rotation of the batter board 16 about the pivot point 17. Rotation of the batter board 16 causes the oil sand material 12 to impinge the batter board at varying positions, affecting the lateral positioning of the location of deposition of material 12 on the lower conveyor belt 13.

The lateral distribution of material 12 on the lower belt 13 has been found to be related to side travel of the lower belt.

A sensing means 20 is located longitudinally downstream of the material transfer point and detects lateral displacement of the lower conveyor belt 13, preferably of its side edge. Preferred sensing means 20 are ultrasonic proximity sensors 21,22 such as the Honeywell Micro Switch Model 941 C2W 2D 1 CO. Other position sensors may be used and will be known to persons skilled in the art. Two sensors 21,22 are preferably off-set longitudinally from each other to limit interference. A minimum of one sensor is employed. Two sensors 21,22 are preferably used for increased reliability through redundancy and self-checking.

The sensors 21, 22 are positioned a distance downstream of the transfer point sufficient to allow the load distribution to affect lower belt side travel. In the specific environment of conveying oil sand material 12, a distance of 10 to 50 m is preferred. The sensors 21,22 are positioned such that an ultrasonic beam is directed in-line with the edge of the belt 13 and is reflected back into the sensors. The reflection time is indicative of the distance of the belt edge from the sensors. The sensing means 20 thus produces a signal 23 with a characteristic (in this case the voltage ) indicative of lateral displacement to the belt edge relative to the position when the belt is centered.

In the preferred embodiment shown in FIG. 1, the distances from the belt edge to the sensors 21,22 (west and east) are shown as X1 and X2 respectively. When the belt is centered, X1=X2. Process limits are set for variation in lateral belt displacement to allow for minor variations such as belt edge fraying, which need not be distinguished.

Figure 2:
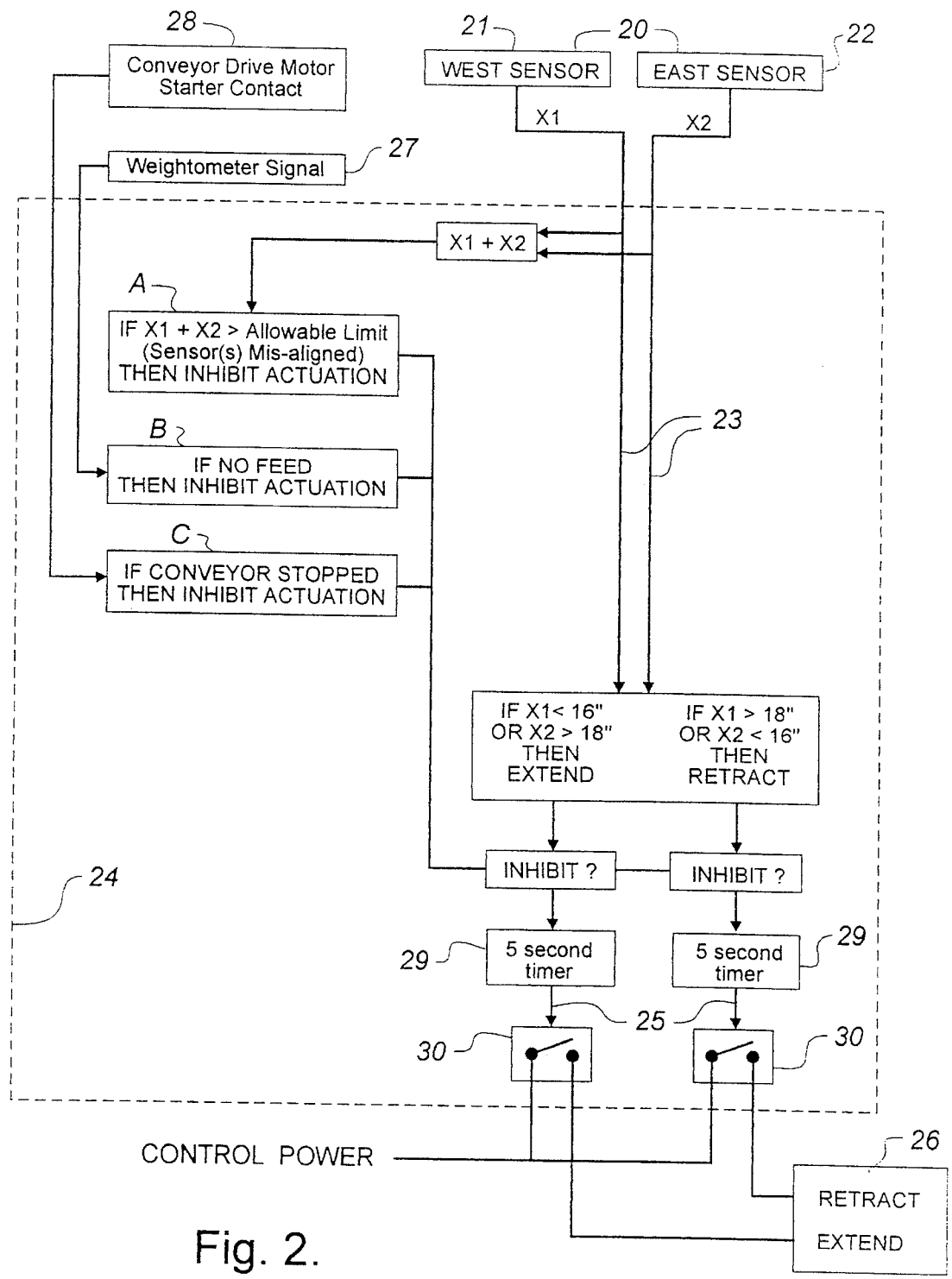
FIG. 2 is a flowsheet illustrating a preferred embodiment of the control logic of the system of FIG. 1.

The sensor's signal 23 is received by a batter board positioning control system 24. FIG. 2 illustrates the control logic used by the control system 24 to test the sensor signal 23 against the set process limits and to appropriately produce a correcting signal 25 for adjusting the positioning ram 18. A ram control interface 26 receives the correcting signal 25 and appropriately enables extension and retraction adjustment of the positioning ram 18. As seen from FIG. 2, the limits for lateral belt displacement are set such that, if X 1 or X2 varies by more than 1" from the center position, a correcting signal to adjust the ram 18 (extend or retract) is produced.

The control logic of FIG. 2 uses set point control and includes a number of override conditions to prevent belt adjustment in certain circumstances. It will be understood by persons skilled in the art that other control logic or analog systems may be utilized to control the batter board in response to the detected belt displacement. The logic will vary widely in order to satisfy the needs of the particular material transport environment.

Three override conditions A,B,C are included in the control logic of FIG. 2, any one of which inhibits issuance of the correcting signal 25 to adjust the positioning ram 18. Condition A tests an outside limit of the sum of X1 and X2 to detect misalignment or malfunction of the sensors 21,22. Condition B tests a weightometer 27 associated with one or both of the conveyor belts 10, 13 to detect when the belts are not loaded with oil sand material 12, in which case no correcting adjustment can occur; this prevents the batterboard being extended to its limit as it tries to correct a side travel. The third condition C receives an input signal from one or both of the conveyor belt drive motor starter contacts 28 to ensure that no lower belt adjustment takes place when the conveyor belts 10, 13 are stopped. Alarms or signal lights may be used to indicate any of these conditions to the operator.

Apart from one of the above override conditions A,B,C, when the detected distances X1 or X2 are outside of the set limits, the correcting signal 25 is generated by the control logic to extend or retract the positioning ram 18. The correcting signal 25 is controlled by adjustable timers 29. A characteristic of the positioning ram 18 is that it moves at constant speed. Therefore, the distance which the ram 18 is ultimately extended or retracted by the correcting signal 25 can be controlled with the timers 29. A setting of 1 inch=7 sec was found to be suitable and characteristic of the particular positioning ram 18. Operating the timers 29 at 5 seconds then resulted in correcting adjustments to the positioning ram of ¾ inch with issuance of each correcting signal 25.

Figure 4:
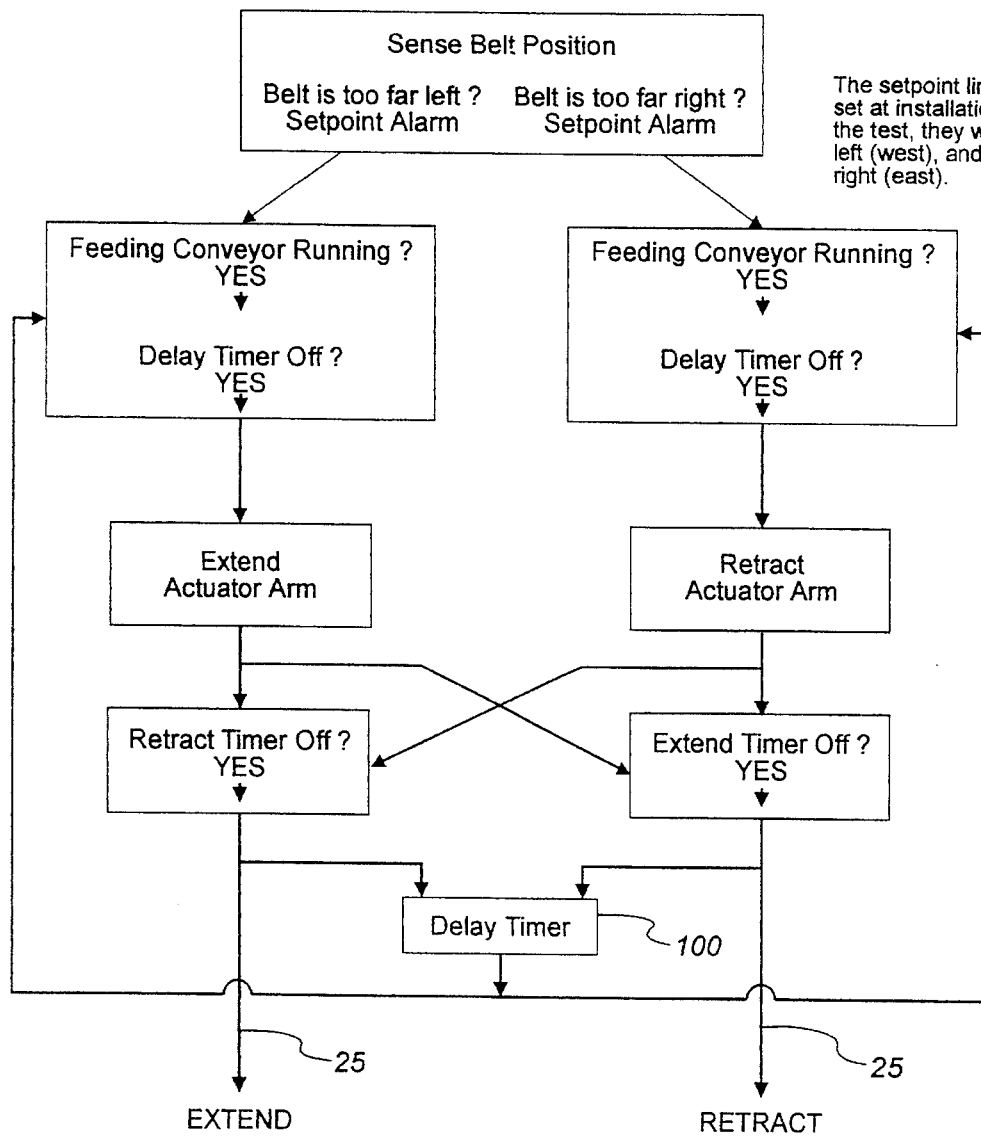
FIG. 4 is a flowsheet illustrating the control logic of an earlier prototype of the system of the present invention, as described in the examples hereinafter.
Figure 5:
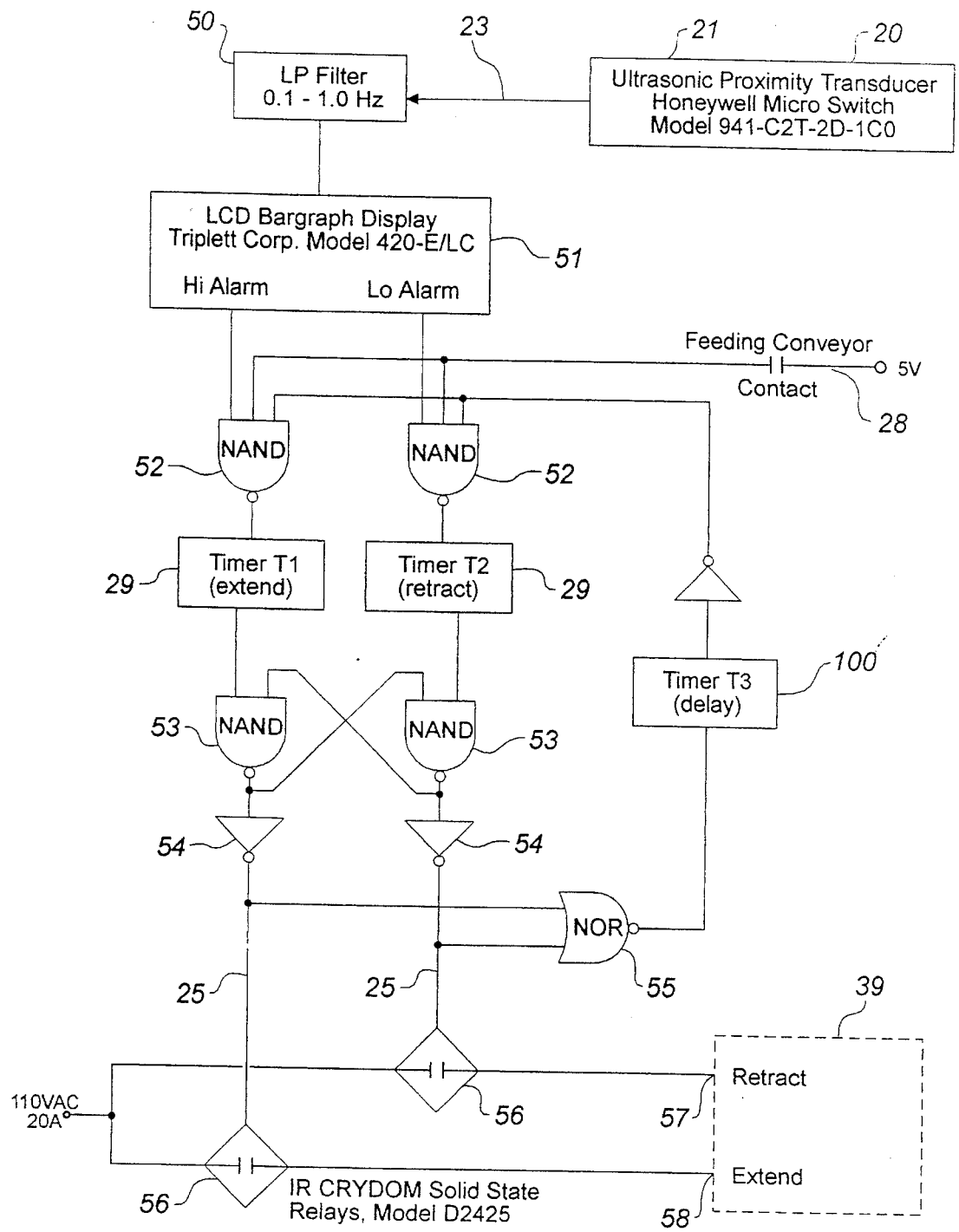
FIG. 5 is a schematic circuit diagram of the apparatus to adjust the batter board in response to the detected belt displacement in accordance with the control logic of FIG. 4.
Figure 6:
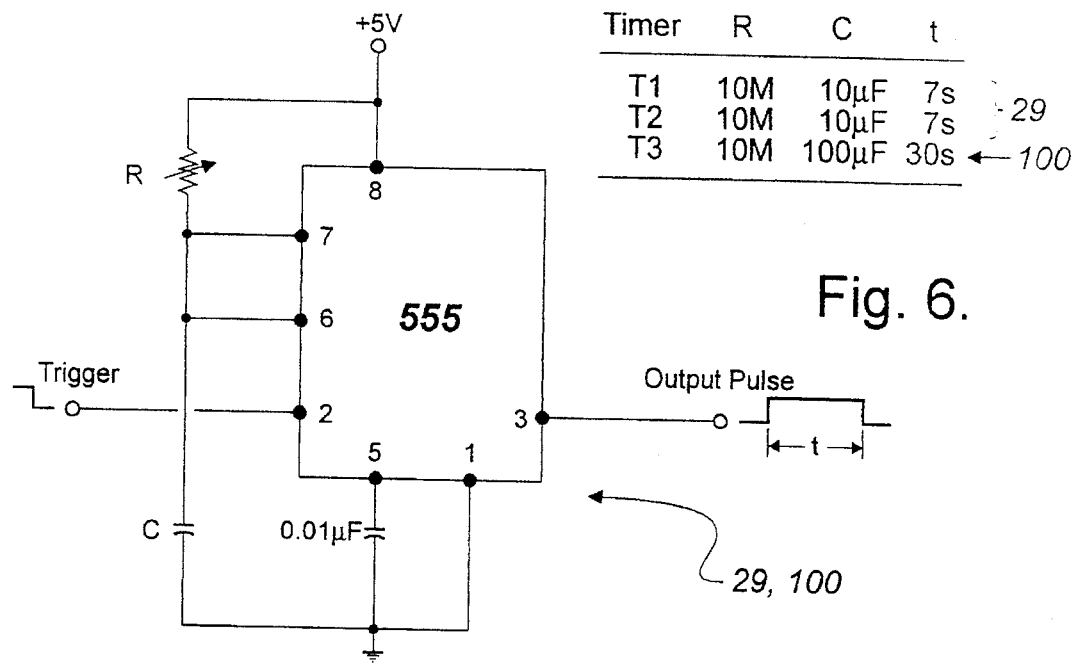
FIG. 6 is a circuit diagram of the timers shown in FIG. 5.
Figure 7:
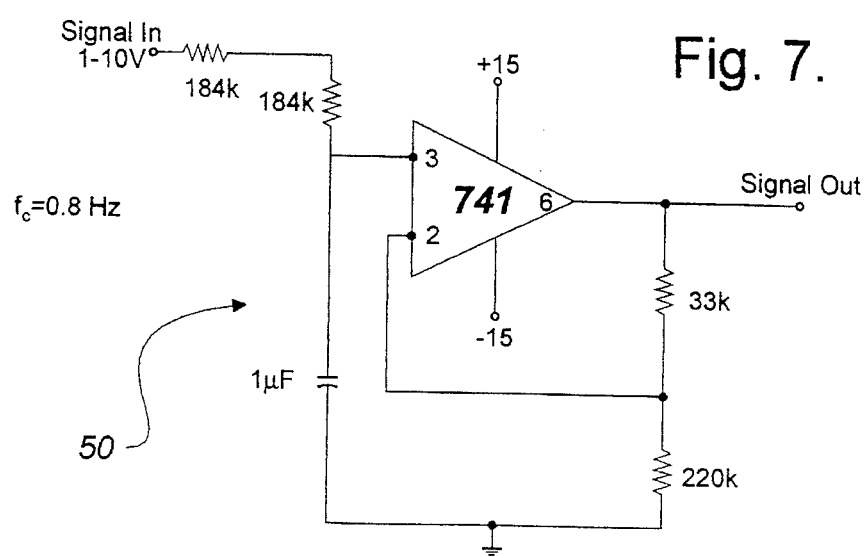
FIG. 7 is a circuit diagram of the low pass filter shown in FIG. 5.

The control logic includes a delay timer 100, shown later in FIG. 4, to avoid overlapping correcting signals (i.e. to allow the batter board 18 to be extended in response to one correcting signal 25 and to reach equilibrium before the next correcting signal is sent). A 30 second time delay is typically used.

In the case of an electrically operated positioning ram, the correcting signal activates relays 30 which can directly drive the ram. In the preferred case of a hydraulic positioning ram, similar relays 30 activate the electro-hydraulic ram control interface 26.

Figure 3:
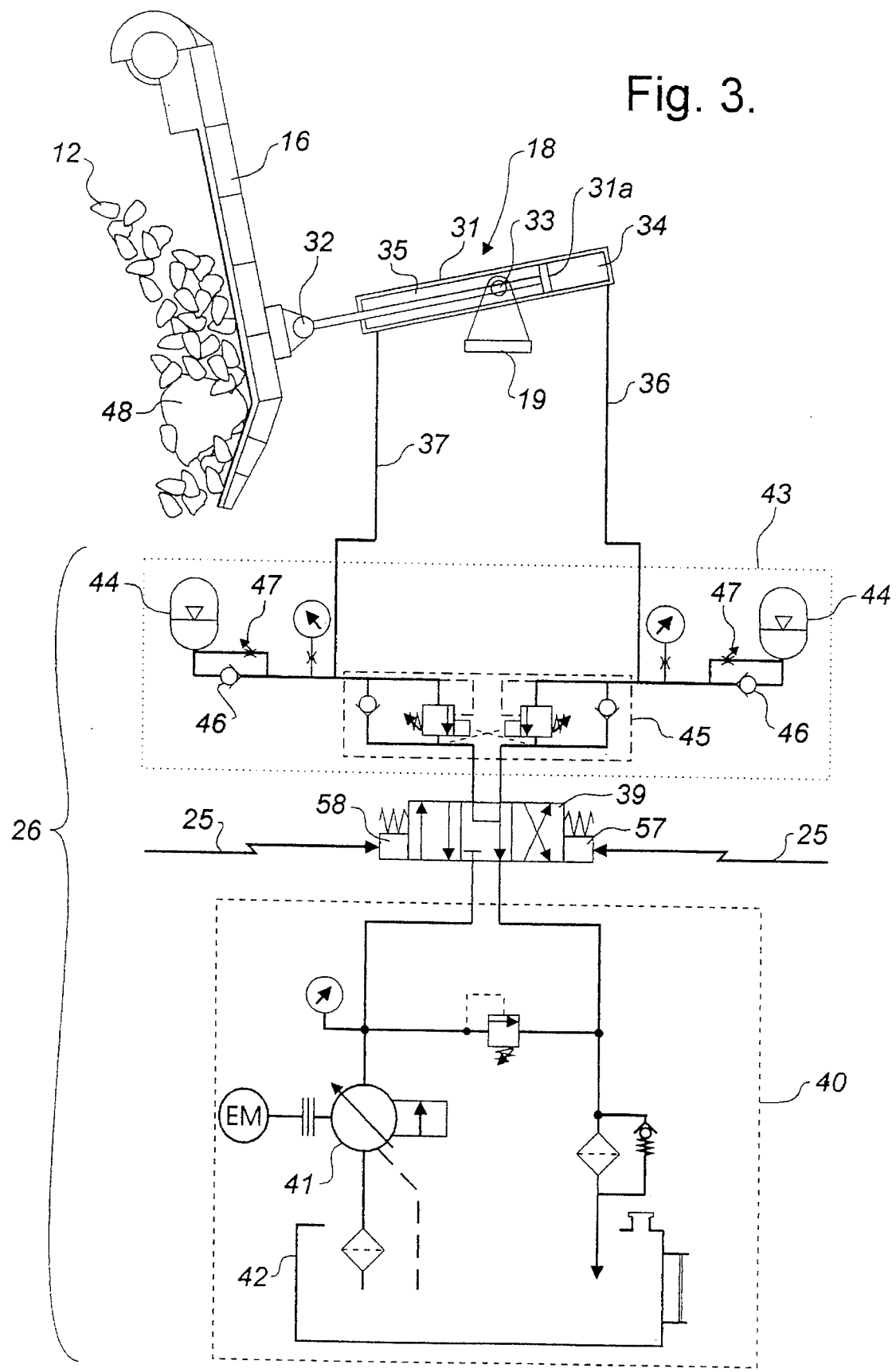
FIG. 3 is a schematic view of the batter board and a hydraulic positioning ram presented with a hydraulic schematic of the shock absorbing and hydraulic control systems.

Having reference to FIG. 3, the preferred positioning ram 18 is a double-acting hydraulic cylinder 31 connected to the batter board 16 at pivot point 32, and to the stationary frame 19 at pivot point 33. The pivot points 32,33 provide rotational freedom in both vertical and horizontal planes to avoid moment loads as the ram 18 rotates in conjunction with batter board 16 rotation. The hydraulic cylinder 31 comprises an extend chamber 34 and a retract chamber 35 separated by a piston and piston rod assembly 31*a*. The extend and retract chambers 34,35 are connected with hydraulic lines 36,37 to the ram control interface 26 comprising a conventional solenoid operated extend/retract control valve means 39 and an electrically powered hydraulic power supply 40. The hydraulic power supply 40 comprises a hydraulic pump 41 and a fluid reservoir 42. The hydraulic pump 41 supplies pressurized hydraulic fluid from the reservoir 42 for routing by the control valve means 39. The control valve means 39 comprises solenoids 57,58 and internal passageways which enable routing of hydraulic fluid to the extend or retract chamber 34,35 to enable extension or retraction of the ram 18 respectively. Correspondingly, the control valve means 39 routes hydraulic fluid, displaced from the idle chamber, back to the reservoir 42.

A shock absorbing system 43 is incorporated into lines 36,37 for absorbing physical shocks exerted on the batter board 16 from the falling material 12, thereby preventing mechanical damage to the ram 18. The system 43 comprises conventional gas bladder-type accumulators 44, identically connected to each of the extend and retract chambers 34,35, and a hydraulic chamber balancing block 45.

The inlet to each accumulator 44 is fitted with a check valve 46 and an adjustable restriction valve 47 bypassing the check valve 46. One set of accumulator 44, check valve 46, and restriction valve 47 is installed on the extend chamber 34 to react to shock loading. A second set 44,46,47 is installed on the retract chamber 35 to hydraulically balance the system response.

In the event of an impact from a large rock 48 on the batter board 16, the piston assembly 36 rapidly displaces a volume of hydraulic fluid from the extend chamber 34. The displaced fluid flows through the check valve 46 and into the accumulator 44. The accumulator's gas bladder is compressed, absorbing the instantaneous shock. Immediately afterwards, the compressed gas bladder forces the hydraulic fluid back out through the restriction valve 47 and into the extend chamber 34 to restore the previous pre-impact piston assembly 36 and batter board 16 positions. It is important that the fluid flow rates through the restriction valve 47 and the balancing block 45 be tuned to cooperate; flowing a relatively greater volume of fluid through the restriction valve 47 before the balancing block equalizes the chamber 34,35 pressures, thereby permitting the piston assembly 36 sufficient time to recover shock-displaced fluid.

The invention is further illustrated by the following example, in which a prototype of the side travel control system and the improved shock absorbing positioning ram was demonstrated.

EXAMPLE

A system as illustrated in FIG. 1, with only a single sensing means 20 and control logic systems as set out in FIGS. 2 and 3, as built. The circuitry 4 for the control logic is illustrated in FIGS. 4–7. In particular, having reference to FIG. 5, the voltage signal 23 from the ultrasonic proximity sensor 21 described hereinabove is passed through a low pass filter 50 (shown in greater detail in FIG. 7). The signal output from the filter 50 is sent to a multi-function display and alarm unit 51 with hi - lo alarm capabilities such as an LCD Bargraph Display from Triplett Corp Model 420 E/LC, to generate a digital high or low alarm signal dependent on the set points for the sensor 20 input (set points for belt offsets of 1.5" west and 2.8" east) and the input voltage of the signal 23. The output signal from the alarm unit 51, together with operating status input signals from the feed conveyor (upper conveyor) drive motor starter contact 28 and the delay timer 100 (T3 in FIG. 6), are fed to a pair of logic circuits for each of extending and retracting the positioning ram 18. The circuits each comprise NAND gates 52 to ensure that no correcting signal 25 results if the conveyor belt is not moving or if the delay timer 100 is operating. The output signals from the NAND gates 52 are fed to timers 29 (T1 and T2 in FIG. 6) which were set at 7 seconds. The output signals from the timers 29 are passed through NAND gates 53 (which are interconnected to avoid contrary correcting signals) and an amplifier NOT gate combination 54 to amplify and invert the on-off signal. The outputs from the NOT gates 54 are connected through a NOR gate 55 to the delay timer 100. The delay timer 100 (set at 30 seconds) is switched on whenever a correcting signal 25, to adjust the positioning ram 18, is output from the logic circuit. The delay timer 100 is connected to the input of the NAND gates 52 to prevent input signals from flowing through the logic circuit for a period of time sufficient to allow the batter board 16 to be moved and be at rest before a further correcting signal 25 can be output from the circuit. The output signals from the NOT gates 54 (the ultimate correcting signals 25) are fed to relays 56 (such as IR CRYDOM Solid State Relays, Model D2425) to introduce control power to one of either of the retract or extend control solenoids 57,58 on the control valve means 39.

Figure 8:
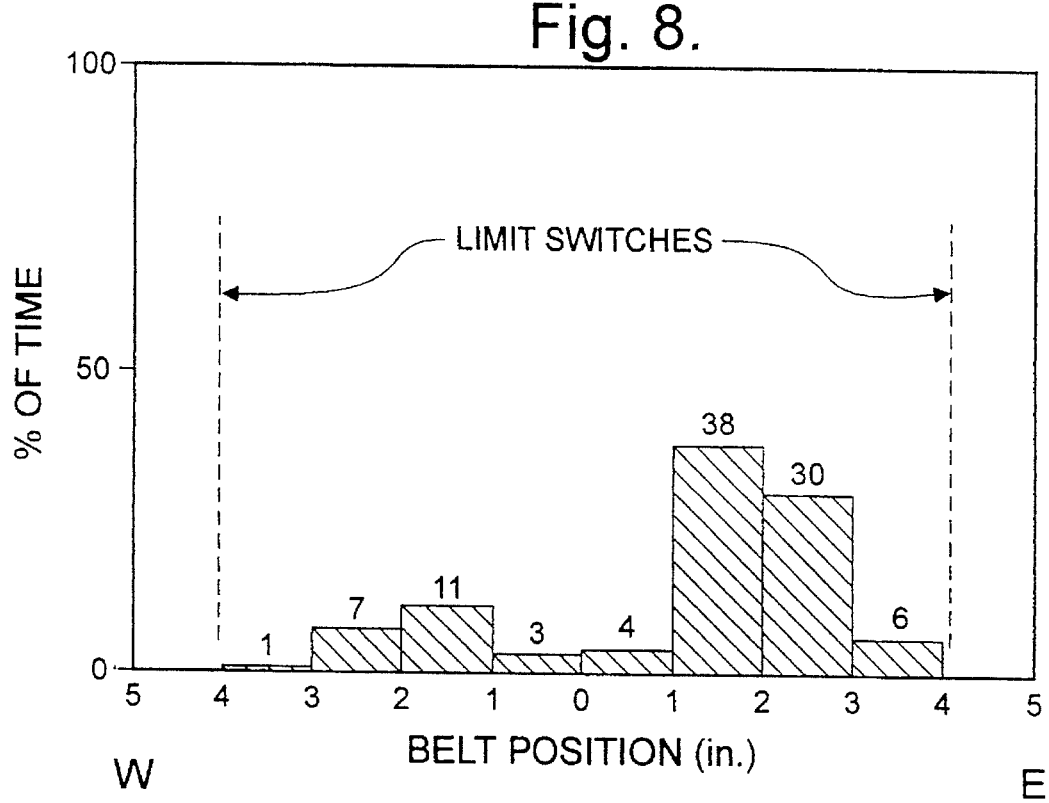
FIG. 8 is a histogram plot showing lateral belt travel in a conveyor belt system as illustrated in FIG. 1, without the side travel control of this invention applied.
Figure 9:
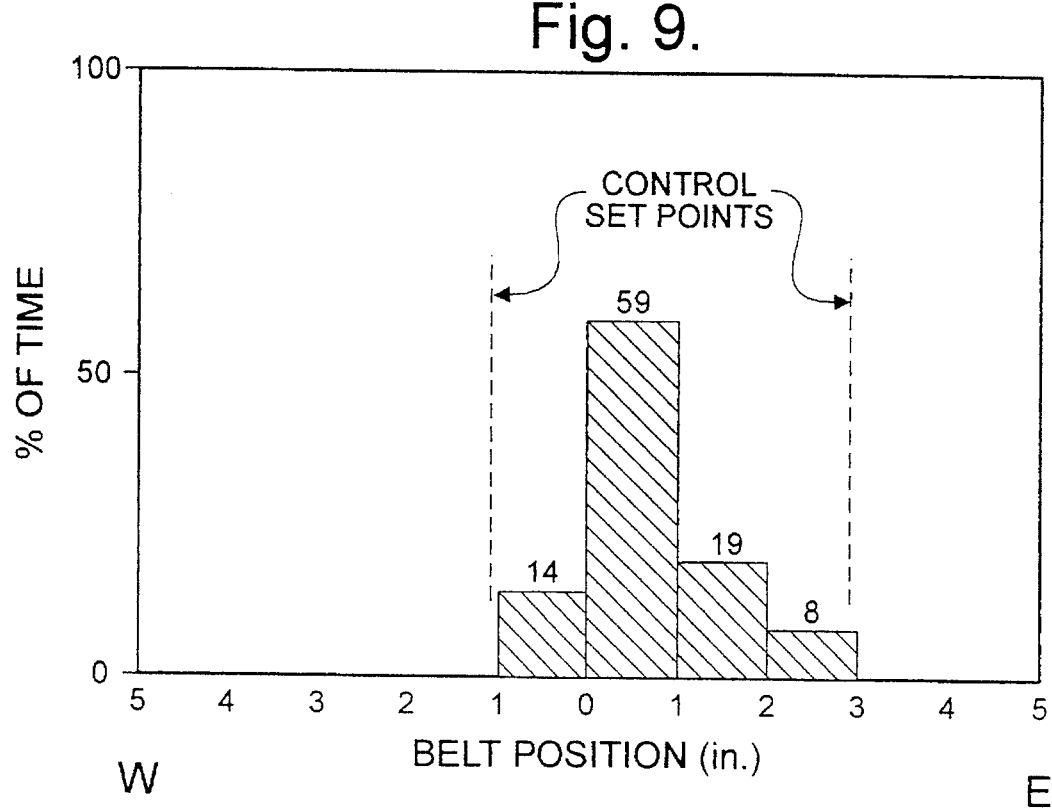
FIG. 9 is a histogram plot showing lateral belt travel in a conveyor belt system as illustrated in FIG. 1, with the side travel system of this invention applied.

To test the above described prototype, the conveyor system was operated for a number of hours to compare belt side travel with and without the correcting system. FIGS. 8 and 9 show histograms of belt side travel in both modes. Without any correction for side travel by batter board adjustment, FIG. 8 demonstrates that in five hours of monitoring, the belt spent 7% of its time within the acceptable 0–1" positions, 49% of its time between 1 and 2" off center, 37% of its time between 2 and 3" off center and 7% of its time between 3 and 4" off center. During that monitoring period, one trip of the west limit switch (set at 4" off center) for the conveyor caused an outage of about 5 minutes. A similar monitoring period with the control system of this invention showed that the belt spent 73% of its time within the acceptable 0–1" position, 19% of its time with the 1–2" off center position and 8% of its time within the 2–3" off center position (FIG. 9). This demonstrated that the system of this invention is operative to effectively limit belt side travel within the control set points set out above.

With respect to the positioning ram 18, a shock absorbing system was installed in combination with a hydraulic ram having an 8" bore, a 24" stroke, and a 3.5" piston rod, such as hydraulic cylinders available from HENNELS model HH MT4, replaced the previous electro-mechanical actuator. These hydraulic cylinders are capable of operating at 2000 psi and 100,000 lbs force with shock loading to 200,000 lbs. The rams 18 are mounted to the stationary frame 19 with a two axis pivot 33 to avoid moment loading on the piston assembly 36 during lateral positioning action and possible twisting action of the batter board 16 due to off-center material loading. The accumulators 46 are 2.5 Imperial gallon, 3000 psi, nitrogen pressure adjustable bladder type such as those available from Accumulators, Inc., model AI-2.5-TR3-100, which were adjusted to provide about 0.5" recoil travel of the positioning ram at maximum anticipated shock loading. The initial bladder gas charge pressure was set to about 200 psi, providing a sufficiently resilient response to absorb typical shock loading. The chamber balancing valve 45 selected is a Sun CBCA-LHN-EBY sandwich type dual counter-balance valve. The control valve means 39 is a typical Hagglunds-Denison solenoid operated directional model A3D01-35-208-03-02-00B5-06527 which is automatically actuated by the extend/retract control relays 56, provided by the side travel control system. The hydraulic power unit 49 delivers hydraulic fluid at a maximum of 3500 psi, and about 5 Igpm, operated at a nominal 2000 psi using a 5 horsepower electric motor coupled to a Hagglunds-Denison pressure compensated piston pump (20 Igpm), model PV6-2RIB-C00. Typical filters, hydraulic reservoir, pressure gauges and relief valves are also used.

Prior to implementation of the improved shock absorbed positioning rams, an electro-mechanical positioning actuator was used. Five of 11 actuator installations had failed completely in less than one year, resulting in operational interruptions and costly actuator replacement. During a similar period of demonstration operation using the hydraulic, shock absorbing positioning rams, no failures or ram related outages were recorded; the shock absorbing system requiring only regular maintenance servicing to maintain the side travel control system operability.

The embodiments of the invention in which an exclusive property or privilege is claimed are defined as follows:

1. A conveyor belt system for transporting particulate material comprising:

an endless first conveyor belt mounted on a roller assembly;

an endless second conveyor belt having a diecharge end located above the first conveyor belt and positioned to drop material downwardly in an arcuate path onto the first conveyor belt the second conveyor belt, being disposed angularly relative to the first conveyor belt;

a panel suspended generally vertically in the path of the material falling between the second and first conveyor belts, for deflecting the material to laterally position it on the first conveyor belt;

means for adjusting the position of the panel to adjust the location of deposition of the material on the first conveyor belt;

a belt edge position sensor, associated with the first conveyor belt, for monitoring the location of the edge of the first conveyor belt and producing a signal indicative of lateral displacement of the edge relative to its location when the belt is centered on the roller assembly;

said adjusting means comprising a double acting hydraulic positioning ram for moving the panel, means, comprising hydraulic accumulator means, connected with the ram, for absorbing shock applied to the ram, a pressurized hydraulic fluid source, line means for connecting the hydraulic fluid source with the ram, and control valve means associated with the line means for appropriately directing pressurized hydraulic fluid to the ram so that the ram can be extended and retracted in response to the detected lateral displacement of the first conveyor belt.

2. The system of claim 1, wherein said accumulator means comprises a gas bladder type hydraulic fluid accumulator, an inflowing check valve, an adjustable outflowing restriction valve located around the check valve, and a hydraulic chamber balancing means whereby the fluid volumetric flow rate of the restriction valve is greater than that through the balancing means.

* * * * *